(12) United States Patent
Rupavatharam et al.

(10) Patent No.: US 10,742,570 B1
(45) Date of Patent: Aug. 11, 2020

(54) UTILIZING VIRTUAL ROUTING AND FORWARDING (VRF) INTERFACES TO MANAGE PACKET TRANSMISSION THROUGH AN INTERNAL INTERFACE

(71) Applicant: Juniper Networks, Inc., Sunnyvale, CA (US)

(72) Inventors: Sreekanth Rupavatharam, Campbell, CA (US); Erin C. MacNeil, Carp (CA); Hariprasad Shanmugam, Kanata (CA)

(73) Assignee: Juniper Networks, Inc., Sunnyvale, CA (US)

( * ) Notice: Subject to any disclaimer, the term of this patent is extended or adjusted under 35 U.S.C. 154(b) by 507 days.

(21) Appl. No.: 15/447,658

(22) Filed: Mar. 2, 2017

(51) Int. Cl.
*H04L 12/935* (2013.01)
*H04L 12/713* (2013.01)
*H04L 12/741* (2013.01)

(52) U.S. Cl.
CPC ........ *H04L 49/3009* (2013.01); *H04L 45/586* (2013.01); *H04L 45/745* (2013.01); *H04L 2212/00* (2013.01)

(58) Field of Classification Search
CPC .. H04L 49/3009; H04L 45/586; H04L 45/745
See application file for complete search history.

(56) References Cited

U.S. PATENT DOCUMENTS

| | | | | |
|---|---|---|---|---|
| 2006/0106934 A1* | 5/2006 | Figaro | ..................... | H04L 45/00 709/227 |
| 2013/0282884 A1* | 10/2013 | Chandrasekaran | ..... | H04L 49/70 709/223 |
| 2014/0185622 A1* | 7/2014 | Yeh | ......................... | H04L 45/12 370/401 |

* cited by examiner

*Primary Examiner* — Kodzovi Acolatse
*Assistant Examiner* — Farhad Ali
(74) *Attorney, Agent, or Firm* — Harrity & Harrity, LLP

(57) ABSTRACT

A device may receive, from the packet processing component and through an internal interface, a packet that includes a virtual routing and forwarding (VRF) interface identifier associated with a VRF interface of a virtual device. The internal interface may be associated with multiple external interfaces. The device may modify a value identifying an incoming interface via which the packet is received after receiving the packet that includes the VRF interface identifier. The modified value may be associated with the virtual device, and the modified value may allow an upper communication layer to determine that the packet is associated with the virtual device. The device may provide the packet to the upper communication layer after modifying the value identifying the incoming interface via which the packet is received to permit the upper communication layer to forward the packet to a destination.

20 Claims, 6 Drawing Sheets

UTILIZING VIRTUAL ROUTING AND FORWARDING (VRF) INTERFACES TO MANAGE PACKET TRANSMISSION THROUGH AN INTERNAL INTERFACE

BACKGROUND

In internet protocol (IP) networks, virtual routing and forwarding (VRF) allows multiple instances of a forwarding table to co-exist within a router at the same time. Using a single device to host multiple instances of a forwarding table isolates traffic traveling across the network without needing multiple devices to segment network traffic.

SUMMARY

According to some possible implementations, a device may receive, from the packet processing component and through an internal interface, a packet that includes a virtual routing and forwarding (VRF) interface identifier associated with a VRF interface of a virtual device. The internal interface may be associated with multiple external interfaces. The device may modify a value identifying an incoming interface via which the packet is received after receiving the packet that includes the VRF interface identifier. The modified value may be associated with the virtual device, and the modified value may allow an upper communication layer to determine that the packet is associated with the virtual device. The device may provide the packet to the upper communication layer after modifying the value identifying the incoming interface via which the packet is received to permit the upper communication layer to forward the packet to a destination.

According to some possible implementations, a method may include receiving, by a network device, a packet through a virtual routing and forwarding (VRF) slave interface of a virtual device. The method may include determining, by the network device, a VRF interface identifier for the packet. The method may include adding, by the network device, the VRF interface identifier to the packet. The VRF interface identifier may identify a VRF interface of the virtual device that is associated with an external interface. The external interface may be one of multiple external interfaces associated with an internal interface. The method may include providing, to a packet processing component of the network device, the packet after adding the VRF interface identifier to the packet. The network device may provide the packet to the packet processing component through the internal interface. The packet processing component may transmit the packet, through the external interface associated with the VRF interface, to a destination outside of the network device.

According to some possible implementations, a non-transitory computer-readable medium may store one or more instructions that, when executed by one or more processors, cause the one or more processors to receive, from a switching fabric and through an internal interface, a packet that includes a virtual routing and forwarding (VRF) interface identifier associated with a VRF interface. The internal interface may link the switching fabric to a controller of the network device. The internal interface may be associated with a plurality of external interfaces of the network device and/or a plurality of packet processing components of the network device. The one or more instructions may cause the one or more processors to modify a value identifying an incoming interface via which the packet is received. The modified value may allow an upper communication layer to determine that the packet is associated with the VRF interface. The one or more instructions may cause the one or more processors to determine that the packet is associated with the VRF interface. The one or more instructions may cause the one or more processors to provide the packet to the upper communication layer after modifying the value indicating the incoming interface via which the packet is received.

DETAILED DESCRIPTION

The following detailed description of example implementations refers to the accompanying drawings. The same reference numbers in different drawings may identify the same or similar elements.

Virtual routing and forwarding (VRF) allows multiple instances of a forwarding table to co-exist within a network device at the same time. To implement VRF, a network device (e.g., a router) may support one or more virtual interfaces, and the one or more virtual interfaces may be associated with one or more corresponding forwarding information bases (FIBs) that serve as forwarding tables for the one or more virtual interfaces. An application or a service may match (e.g., bind) to a virtual interface (e.g., using a socket application programming interface (API)) to use the virtual interface to route traffic.

In some cases, an infrastructure for a network device may include a single internal interface (e.g., a single physical interface) that may serve as a path to one or more packet processing components, and the one or more packet processing components may send packets outside of the network device using one or more external interfaces. The one or more external interfaces may be associated with one or more virtual interfaces. However, because a controller of the network device receives packets using the single internal interface, the controller may be unable to determine an incoming interface via which the packets arrived and/or an outgoing interface (e.g., an external interface) to use when transmitting the packets to another device.

Implementations described herein provide a network device that is capable of using one or more VRF interfaces to manage packet transmission through a single internal interface (e.g., a single physical interface). For example, the network device may add VRF information (e.g., a VRF interface identifier, a VRF slave interface identifier, etc.) to a packet to determine a destination. In this way, the network device is able to use the VRF information to manage traffic flow through a single physical interface, thereby reducing network infrastructure cost. Furthermore, the network device may implement the process without modifying native operating system-level software, thereby reducing cost of software development.

Figure 1A:
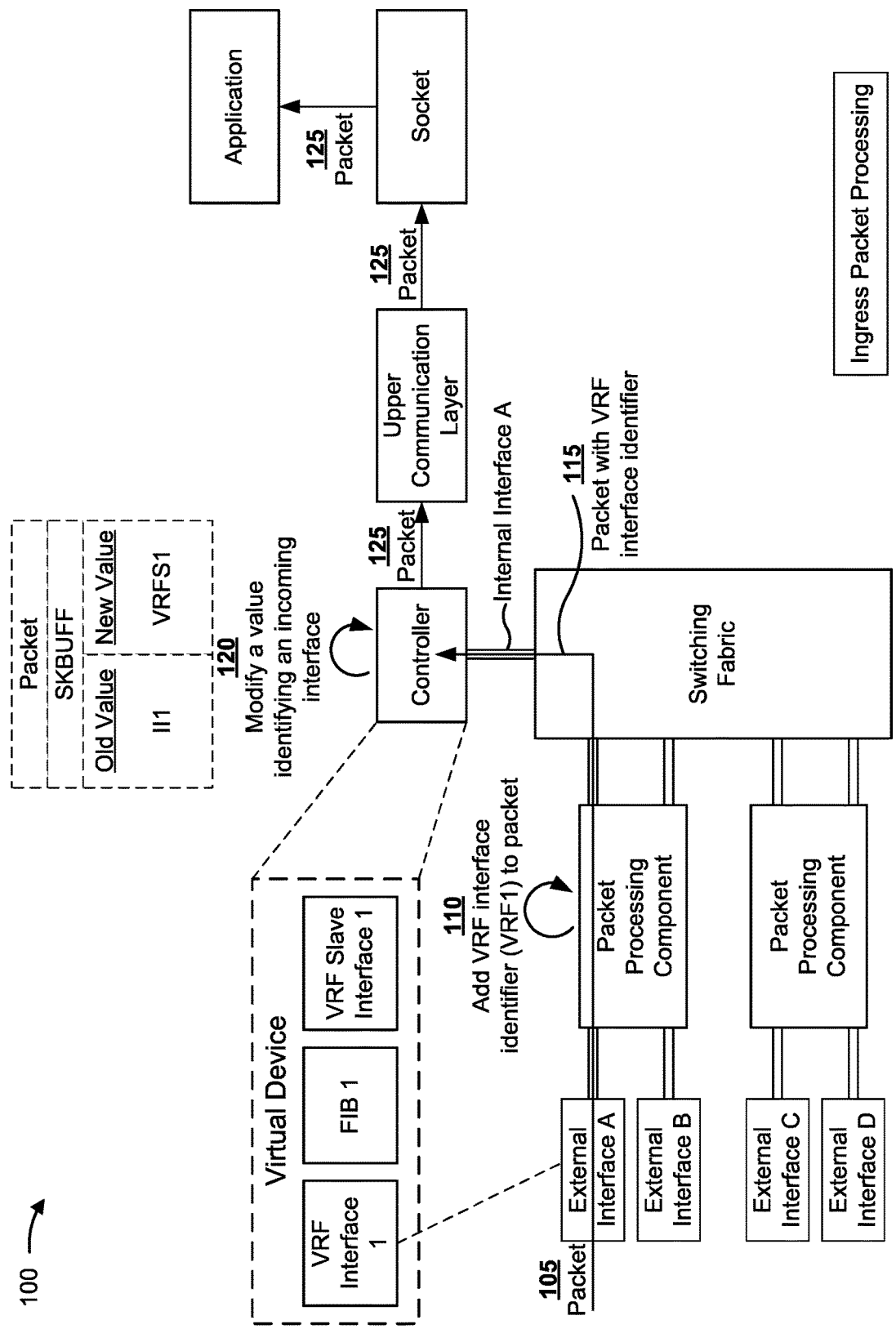
FIGS. 1A and 1B are diagrams of an overview of an example implementation described herein.
Figure 1B:
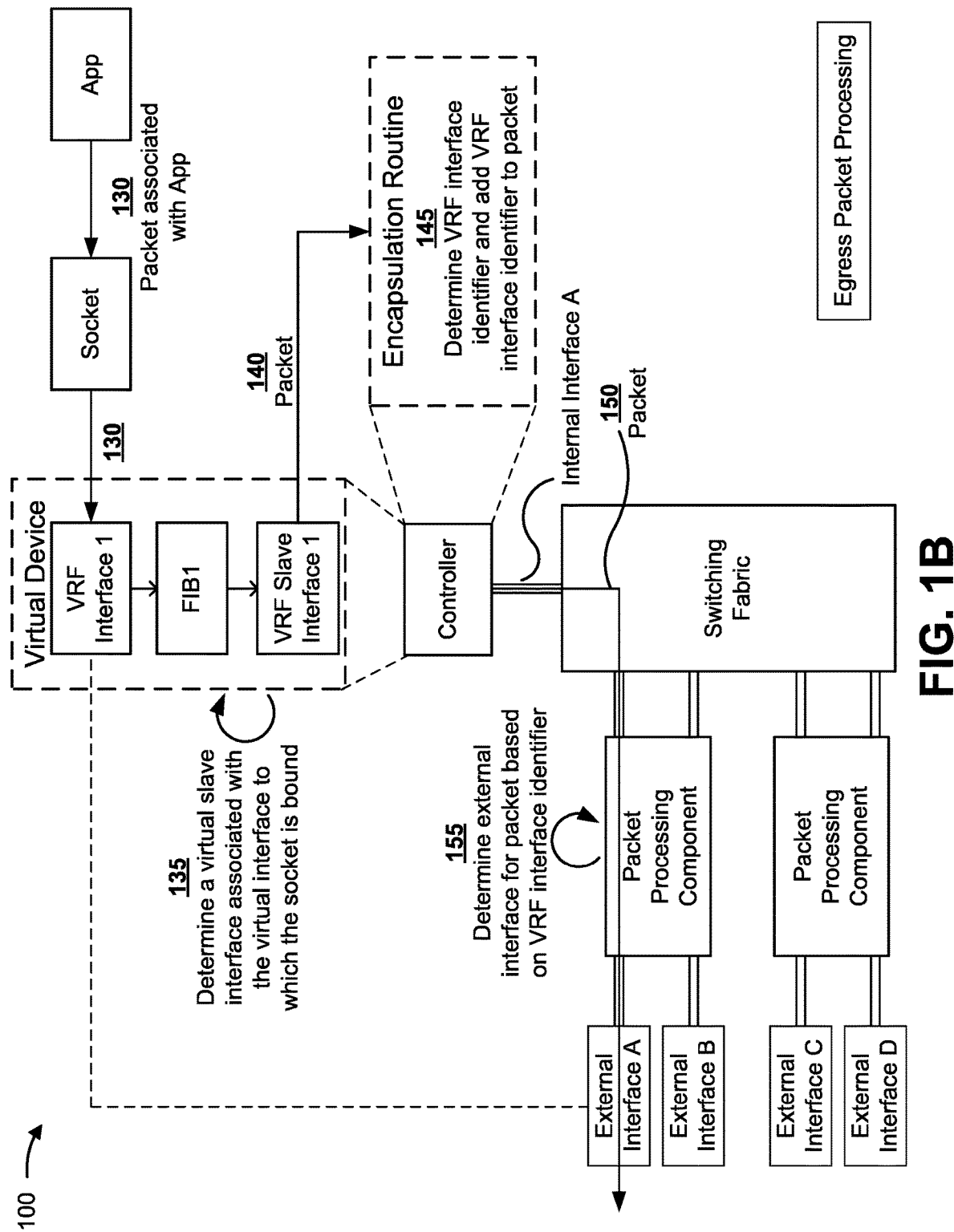

FIGS. 1A and 1B are diagrams of an overview of an example implementation 100 described herein. As shown in FIGS. 1A and 1B, a packet may be sent through a network device (e.g., a router, a switch, a firewall, etc.) using a VRF interface and one or more VRF slave interfaces included in a virtual device. FIG. 1A shows an ingress packet processing data flow. FIG. 1B shows an egress packet processing data flow.

As shown in FIG. 1A, and by reference number 105, the packet may be transmitted through an external interface (e.g., external interface A) to a packet processing component. For example, an application may match (e.g., bind) to a socket that is associated with external interface A, which may cause the packet to be transmitted through external interface A to the packet processing component. In this case, external interface A may be associated with the VRF interface of the virtual device (a logical connection is shown by the dotted line between the VRF interface 1 and external interface A).

As shown by reference number 110, the packet processing component may add a VRF interface identifier to the packet. For example, because external interface A is associated with VRF interface 1, the packet processing component may add type-length-value (TLV) data to a header of the packet. The TLV data may indicate a VRF interface identifier (e.g., shown as VRF1). In some cases, the packet processing component may receive packets through external interface B, which may be associated with another virtual device, causing the packet processing component to add a VRF interface identifier associated with the other virtual device (e.g., VRF2) to the packet.

As shown by reference number 115, the packet processing component may provide the packet, that includes the VRF interface identifier, through an internal interface (e.g., internal interface A) to a controller. In some implementations, the internal interface may be the only internal interface linking the packet processing component to the controller. In some implementations, the internal interface may be one of a group of internal interfaces. In this case, each internal interface, in the group of internal interfaces, may be associated with multiple external interfaces and/or multiple packet processing components.

As shown by reference number 120, the controller may modify a value identifying an incoming interface from which the packet is received. For example, the packet may include the value identifying the incoming interface, and the value may be set to an internal interface identifier (shown as II1 as corresponding to internal interface A) because the packet arrived from the internal interface (i.e., internal interface A). In this case, the controller may use an encapsulation routine to replace the internal interface identifier with a VRF slave interface identifier (shown as VRFS1). For example, the encapsulation routine may use the VRF interface identifier (VRF1) to determine a VRF slave interface identifier (VRFS1) by identifying a value in the VRF interface identifier (e.g., the value 1) and using the value as at least a portion of the VRF slave interface identifier (VRFS1). In some cases, the virtual device may be associated with multiple VRF slave interfaces, and the controller may perform a forwarding table query to determine a VRF slave interface to use as the incoming interface.

As shown by reference number 125, the controller may provide the packet to an upper communication layer, such as an upper transmission control protocol/internet protocol (TCP/IP) layer (e.g., a transport layer, a network layer, a data link layer), and the packet may be provided through a socket to an application that is matched (e.g., bound) to the socket. In this way, a device or component associated with the upper communication layer is able treat the packet as coming from the VRF slave interface (instead of the internal interface), and may use the VRF slave interface identifier to associate the packet with the virtual device, ensuring that the packet reaches a proper destination. Furthermore, by ensuring that the packet reaches the proper destination, the controller improves overall operation of the network device. Additionally, the controller conserves processing resources relative to routing a packet to an improper destination and re-routing the packet to the proper destination.

As shown in FIG. 1B, and by reference number 130, a packet may be provided by an application that is executing on the network device. For example, the application may ping another application or another device that is located outside of the network device. In this case, the packet may be provided through a socket that is associated with a VRF interface of a virtual device (shown as VRF interface 1).

As shown by reference number 135, a controller (e.g., which may implement some or all of the virtual device) may use a forwarding table (e.g., a forwarding information block (FIB), shown as FIB1) to determine a VRF slave interface associated with the VRF interface to which the socket is matched. For example, the forwarding table may store a VRF interface identifier and one or more VRF slave interface identifiers, and the virtual device may compare the VRF interface identifier to one or more VRF slave interface identifiers. In this case, the virtual device may select a VRF slave interface identifier, of the one or more VRF slave interface identifiers, based on the comparison. This may allow the virtual device to provide the packet through the VRF slave interface (e.g., shown as VRF slave interface 1) to an encapsulation routine for further processing.

As shown by reference number 140, the encapsulation routine of the controller may receive the packet through the VRF slave interface. As shown by reference number 145, the encapsulation routine may determine the VRF interface identifier and may add the VRF interface identifier to the packet. For example, the encapsulation routine may determine the VRF interface identifier by identifying a value included in the VRF slave interface identifier, and using the value to determine the VRF interface identifier. In this case, because the packet is received from the VRF slave interface, the packet may include, as an incoming interface value, a VRF slave interface identifier (e.g., VRFS1). The encapsulation routine may identify the value included in the VRF slave interface identifier (e.g., the value 1) and may use the value as at least a portion of the VRF interface identifier (VRF1). Additionally, the encapsulation routine may add the VRF interface identifier to a header, and may encapsulate the packet with the header.

As shown by reference number 150, the controller may provide the packet, that includes the VRF interface identifier, through the internal interface to a packet processing component. In some implementations, the internal interface may be the only internal interface linking the controller to the packet processing component. In some implementations, the internal interface may be one of a group of internal interfaces. In this case, each internal interface, in the group of internal interfaces, may be associated with multiple external interfaces and/or multiple packet processing components.

As shown by reference number 155, the packet processing component may determine an external interface (e.g., external interface A) to use to transmit the packet outside of the network device. For example, the packet processing component may analyze the packet to identify the VRF interface identifier, and may use the VRF interface identifier to determine the external interface. In this case, the external interface may be associated with the VRF interface of the virtual device (a logical connection is shown by the dotted line between VRF interface 1 and external interface A), which may indicate to the packet processing component to select the external interface as the outgoing interface for transmitting the packet outside of the network device.

By using a virtual device to manage traffic flow through multiple external interfaces and through a single internal interface, the controller reduces the cost of network hardware relative to a network infrastructure that uses one internal interface for every corresponding external interface.

As indicated above, FIGS. 1A and 1B are provided merely as examples. Other examples are possible and may differ from what was described with regard to FIGS. 1A and 1B. For example, a network device may use multiple virtual devices, multiple packet processing components, multiple external interfaces, or the like.

Figure 2:
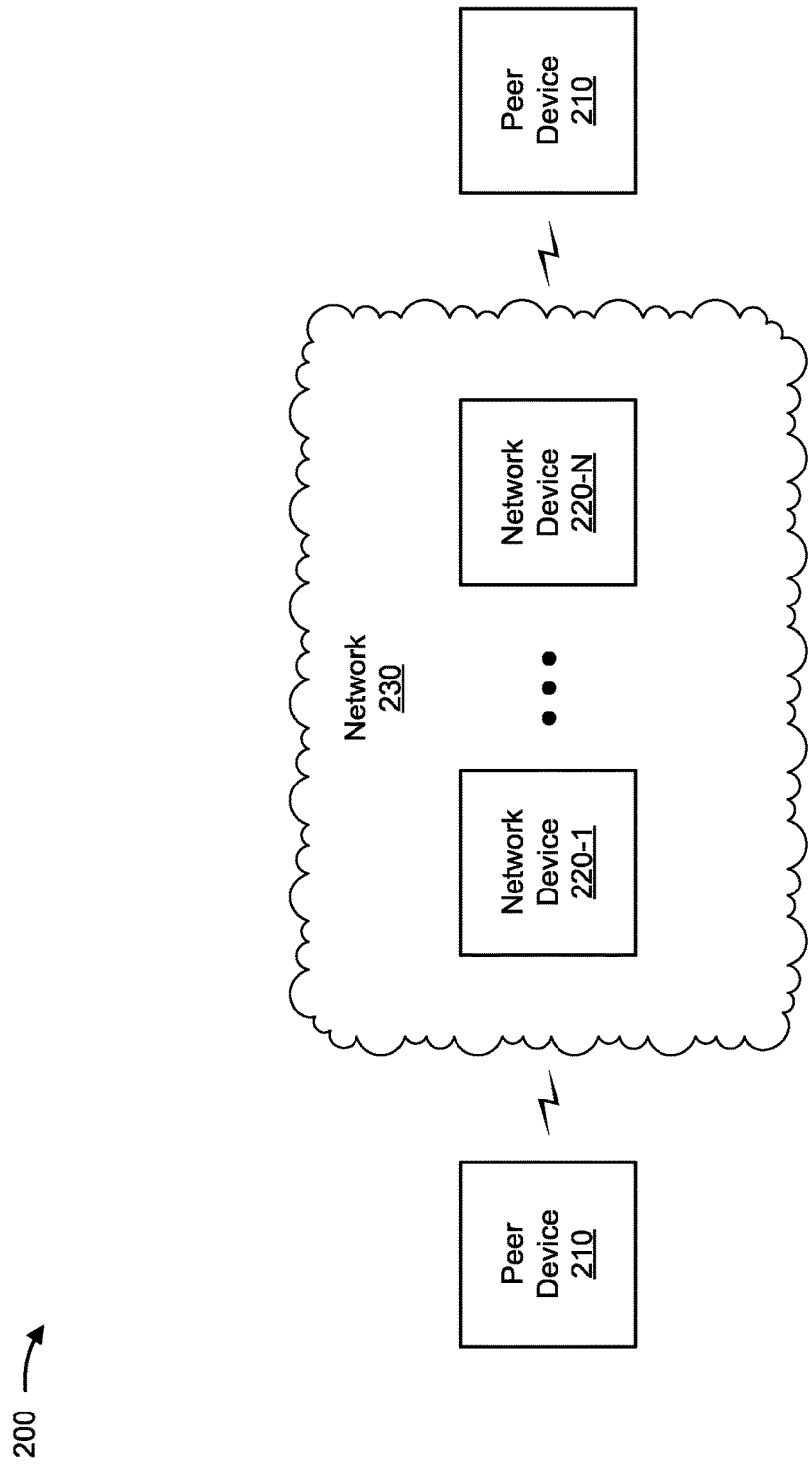
FIG. 2 is a diagram of an example environment in which systems and/or methods, described herein, may be implemented.

FIG. 2 is a diagram of an example environment 200 in which systems and/or methods, described herein, may be implemented.

As shown in FIG. 2, environment 200 may include one or more peer devices 210, one or more network devices 220-1 through 220-N (N≥1) (hereinafter referred to collectively as "network devices 220", and individually as "network device 220"), and a network 230. Devices of environment 200 may interconnect via wired connections, wireless connections, or a combination of wired and wireless connections.

Peer device 210 includes one or more devices capable of receiving and/or providing network traffic. For example, peer device 210 may include a traffic transfer device, such as a router, a gateway, a switch, a firewall, a hub, a bridge, a reverse proxy, a server (e.g., a proxy server, a server executing a virtual machine, etc.), a load balancer, or a similar type of device. Additionally, or alternatively, peer device 210 may include an endpoint device that is a source or a destination for network traffic. For example, peer device 210 may include a computer or a similar type of device. Peer device 210 may receive network traffic from and/or may provide network traffic to other peer devices 210 via network 230 (e.g., by routing packets using network device(s) 220 as an intermediary).

Network device 220 includes one or more devices (e.g., one or more traffic transfer devices) capable of processing, forwarding, and/or transferring traffic between peer devices (e.g., peer devices 210) and/or traffic transfer devices (e.g., other network devices 220). For example, network device 220 may include a router, such as a label switching router (LSR), a label edge router (LER), an ingress router, an egress router, a provider router (e.g., a provider edge router, a provider core router, etc.), a virtual router, or the like. Additionally, or alternatively, network device 220 may include a gateway, a switch, a firewall, a hub, a bridge, a reverse proxy, a server (e.g., a proxy server, a cloud server, a data center server, etc.), a load balancer, or another type of traffic transfer device.

Network 230 includes one or more wired and/or wireless networks. For example, network 230 may include a cellular network (e.g., a fifth generation (5G) network, a fourth generation (4G) network, such as a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
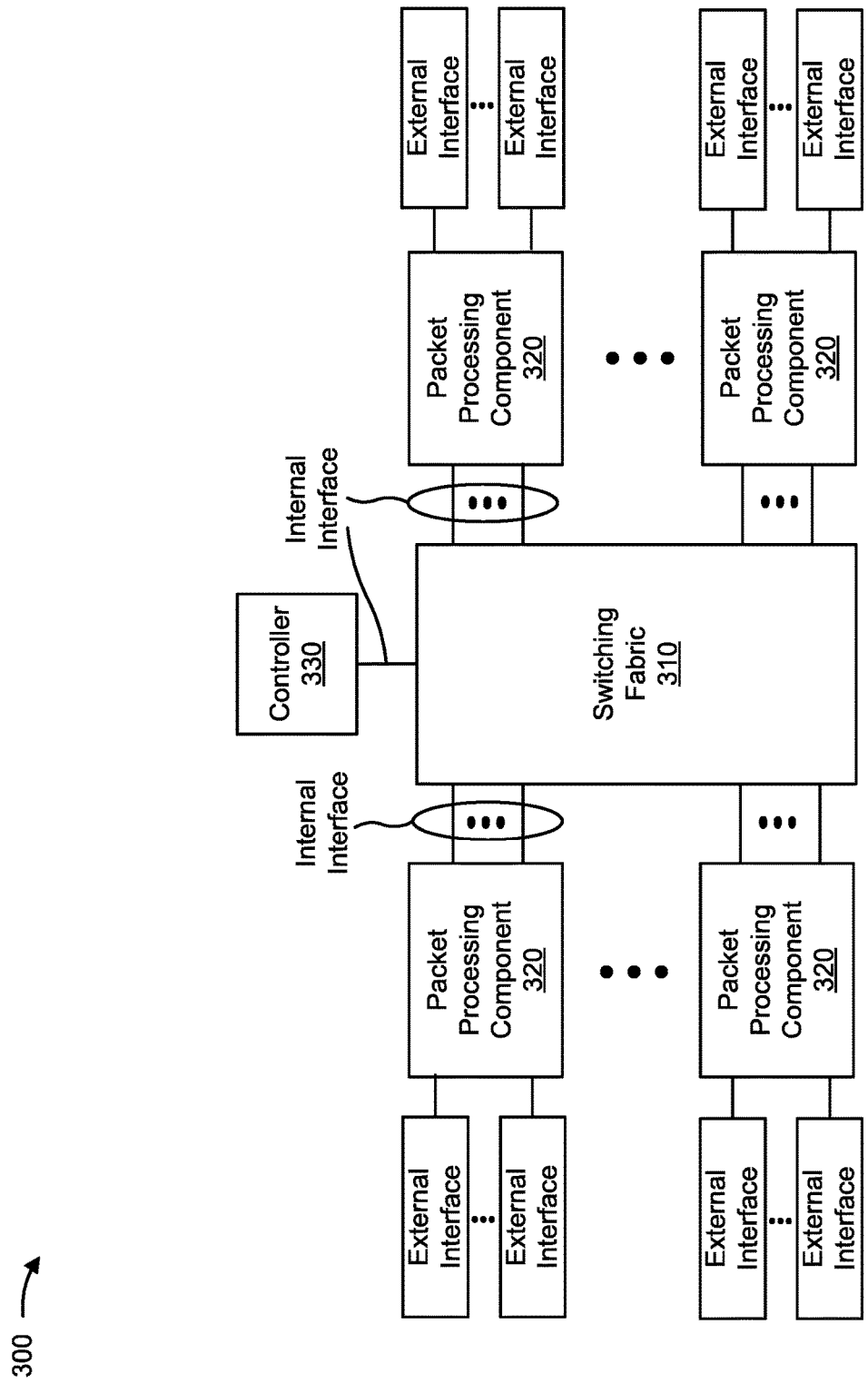
FIG. 3 is a diagram of example components of one or more devices of FIG. 2.

FIG. 3 is a diagram of example components of a device 300. Device 300 may correspond to peer device 210 and/or network device 220. In some implementations, peer device 210 and/or network device 220 may include one or more devices 300 and/or one or more components of device 300. As shown in FIG. 3, device 300 may include a switching fabric 310, one or more packet processing components 320, and a controller 330. Additionally, traffic may be transmitted (provided) and/or received through one or more external interfaces and/or one or more internal interfaces. In some implementations, traffic between switching fabric 310 and controller 330 may be provided and/or received through a single internal interface. In some implementations, traffic between switching fabric 310 and controller 330 may be provided and/or received through a set of internal interfaces, where each internal interface may be designated for a subset of external interfaces and/or a subset of packet processing components 320.

Switching fabric 310 interconnects external interfaces via packet processing components 320. In some implementations, switching fabric 310 may be implemented using one or more crossbars, one or more busses, and/or one or more shared memories. In some implementations, switching fabric 310 may enable external interfaces to communicate. For example, switching fabric 310 may connect with one or more packet processing components 320 via one or more internal interfaces, and the one or more packet processing components 320 may connect with the external interfaces, as described further herein.

Packet processing component 320 includes one or more processing components (e.g., one or more processors) to process packets. Packet processing component 320 may process incoming traffic, such as by performing data link layer encapsulation or decapsulation. In some implementations, packet processing component 320 may receive a packet from switching fabric 310, may process the packet, and may output the processed packet to an appropriate external interface connected to packet processing component 320. Additionally, or alternatively, packet processing component 320 may receive a packet from an external interface, may process the packet, and may output the processed packet to switching fabric 310 for transfer to controller 330 and/or to another external interface (e.g., via the same packet processing component 320 or a different packet processing component 320). Additionally, or alternatively, packet processing component 320 may add VRF information to a header of a packet, and/or may obtain (e.g., identify) VRF information from the header of the packet.

External interface is a point of attachment for physical links, and may be a point of ingress and/or egress for incoming and/or outgoing traffic, such as packets. In some implementations, a single packet processing component 320 may be connected to multiple external interfaces. In some implementations, a single packet processing component 320 may be connected to a single external interface. An external interface may permit communication between a first network device 220 and a second network device 220 that is a neighbor of the first network device 220. External interface may store packets (e.g., in a buffer) and/or may schedule packets for transmission on output physical links. External interface may support data link layer encapsulation or decapsulation and/or a variety of higher-level protocols. In some implementations, a particular external interface may be associated with a particular VRF interface. In some implementations, the one or more external interfaces may not be visible to a kernel of network device 220.

Internal interface is a path that allows packet processing component 320 and/or controller 330 to communicate with switching fabric 310. Internal interface may include, for example, a wired or wireless path, such as a fiber-optic path, an electrical path, or the like. In some implementations, there may be multiple internal interfaces between a single packet processing component 320 and switching fabric 310. In some implementations, there may be a single internal interface between controller 330 and switching fabric 310.

Controller 330 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 330 may include one or more processors that may be programmed to perform a function. In some implementations, controller 330 may include a group of virtual devices that each includes one or more processors.

In some implementations, controller 330 may implement one or more virtual devices that each may include a VRF interface, a forwarding table (e.g., a FIB), and one or more VRF slave interfaces. For example, a virtual device may use the VRF interface as an outgoing interface, may use the forwarding table to store a VRF interface identifier associated with the VRF interface and one or more VRF slave interface identifiers associated with one or more corresponding VRF slave interfaces, and may use a VRF slave interface of the one or more VRF slave interfaces as an incoming interface. In some implementations, a VRF interface may be associated with an external interface, creating a logical connection that allows packet processing component 320 and/or controller 330 to associate the VRF interface with the external interface, and vice versa. In some implementations, controller 330 may add VRF information (e.g., a VRF interface identifier, a VRF slave interface identifier, etc.) to packets, and may utilize a driver that executes an encapsulation routine to multiplex and/or demultiplex packets.

In some implementations, controller 330 may include a random access memory (RAM), a read only memory (ROM), and/or another type of dynamic or static storage device (e.g., a flash memory, a magnetic memory, an optical memory, etc.) that stores information and/or instructions for use by controller 330.

In some implementations, controller 330 may communicate with other devices, networks, and/or systems connected to device 300 to exchange information regarding network topology. Controller 330 may create routing tables based on the network topology information, create forwarding tables based on the routing tables, and forward the forwarding tables to packet processing component 320, such as for use in performing route lookups for incoming and/or outgoing packets.

Controller 330 may perform one or more processes described herein. Controller 330 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 330 from another computer-readable medium or from another device via a communication interface. When executed, software instructions stored in a memory and/or storage component associated with controller 330 may cause controller 330 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
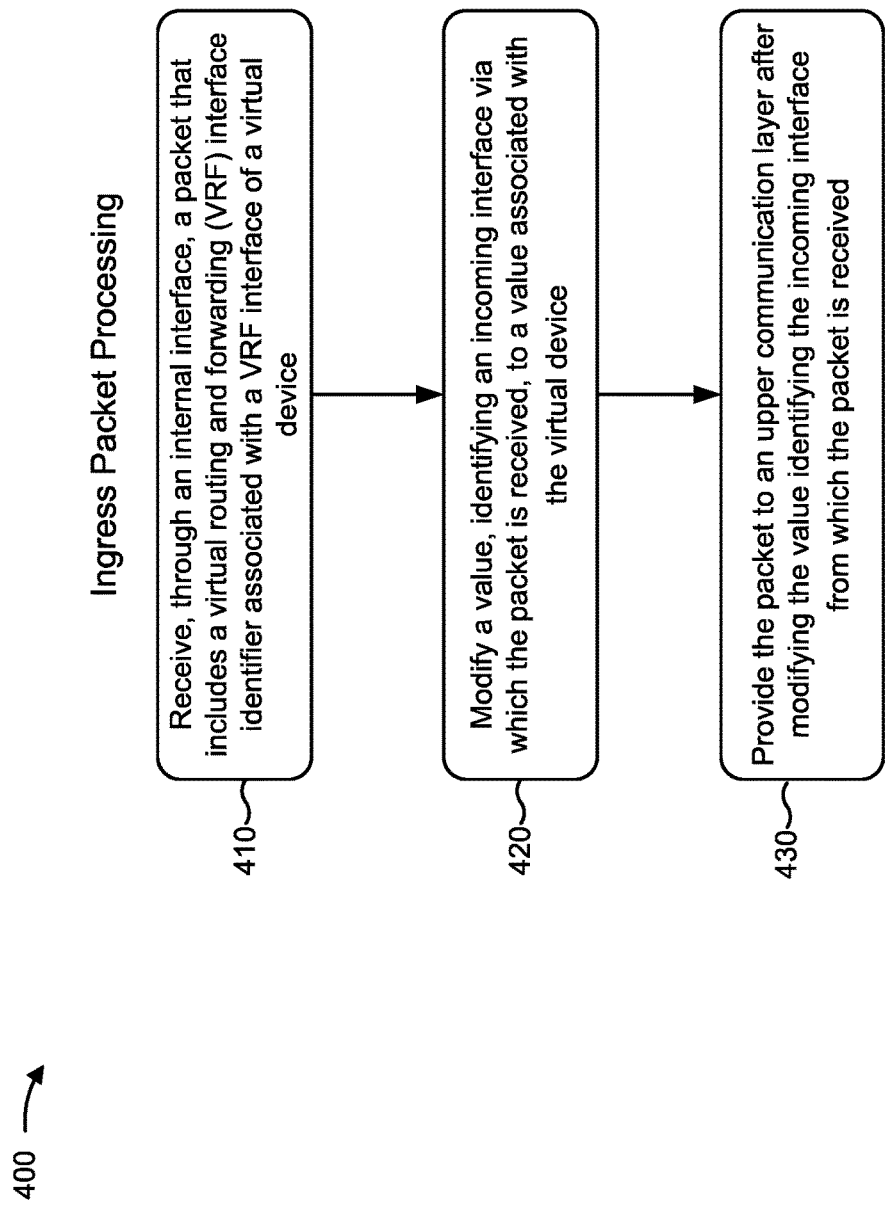
FIG. 4 is a flow chart of an example process for using virtual routing and forwarding (VRF) interfaces to provide an ingress packet through an internal interface.

FIG. 4 is a flow chart of an example process 400 for using VRF interfaces to provide an ingress packet through an internal interface. In some implementations, one or more process blocks of FIG. 4 may be performed by controller 330. In some implementations, one or more process blocks of FIG. 4 may be performed by another device or a group of devices separate from or including controller 330, such as switching fabric 310, packet processing component 320, and/or the like.

As shown in FIG. 4, process 400 may include receiving, through an internal interface, a packet that includes a virtual routing and forwarding (VRF) interface identifier associated with a VRF interface of a virtual device (block 410). For example, controller 330 of network device 220 may receive, from a switching fabric and/or through an internal interface, a packet that includes a VRF interface identifier associated with a VRF interface of a virtual device. In some implementations, the internal interface may be the only internal interface linking controller 330 to switching fabric 310 and/or packet processing component 320. In some cases, the VRF interface may be used as an outgoing interface to determine a destination for the packet. In some cases, the VRF interface may be associated with one or more VRF slave interfaces. A VRF slave interface may be used as an incoming interface to indicate a source from which the packet is received.

In some implementations, network device 220 may generate one or more virtual devices to manage network traffic (e.g., packets). For example, a virtual device may include a VRF interface, a FIB, one or more VRF slave interfaces, or the like. In this case, the one or more VRF slave interfaces may be matched (e.g., bound) to the VRF interface.

In some implementations, such as prior to controller 330 receiving the packet through the internal interface, packet processing component 320 may add a VRF interface identifier to the packet, and may provide the packet to controller 330 through the internal interface. For example, assume an application uses a socket to transmit the packet to packet processing component 320 (e.g., through an external interface). In this case, packet processing component 320 may determine a VRF interface identifier based on the external interface at which the packet arrives, and packet processing component 320 may add metadata (e.g., TLV data) to a header of the packet to add the VRF interface identifier to the packet.

As an example, assume a packet processing component 320 is configured to send and/or receive traffic through a first external interface and/or a second external interface. Further assume that the first external interface is associated with a first virtual device, and that the second external interface is associated with a second virtual device. Further assume an application uses a socket to provide a packet, to packet processing component 320, using the first external interface. In this case, packet processing component 320 may determine that the packet is associated with the first virtual device based on the packet being received via the first external interface. Additionally, packet processing component 320 may add a VRF interface identifier associated with a VRF interface of the first virtual device to a header of the packet (e.g., a VRF interface identifier may by represented by a character string, such as VRF1).

In this way, controller 330 is able to receive the packet and use the VRF interface identifier included in the packet to determine the incoming interface via which the packet arrived.

As further shown in FIG. 4, process 400 may include modifying a value, identifying an incoming interface via which the packet is received, to a value associated with the virtual device (block 420). For example, controller 330 may obtain the VRF interface identifier from the packet, determine a VRF slave interface identifier by using the VRF interface identifier to generate the VRF slave interface identifier, and modify a value identifying an incoming interface to a value associated with the virtual device, such as the VRF slave interface identifier. In some implementations, the modified value may allow an upper communication layer (e.g., an upper TCP/IP layer) to determine that the packet is associated with the virtual device, as described further herein.

In some implementations, controller 330 may obtain the VRF interface identifier from a header of the packet, and may use the VRF interface identifier to determine a VRF slave interface identifier. For example, controller 330 may identify a value included in the VRF interface identifier, and may generate the VRF slave interface identifier using at least a portion of the VRF slave interface identifier. As an example, assume a virtual device is configured with one VRF interface and one corresponding VRF slave interface. Further assume controller 330 obtains a VRF interface identifier of VRF1. In this case, controller 330 may use the value '1' as the VRF slave interface identifier, or may generate the VRF slave interface identifier by appending the value '1' to the end of one or more characters associated with a VRF slave interface identifier (e.g., by appending the value '1' to the end of the string VRFS to have a VRF slave interface identifier of VRFS1). By using a value included in the VRF interface identifier as at least a portion of the VRF slave interface identifier, controller 330 conserves processing resources relative to querying a forwarding table with the VRF interface identifier to determine the VRF slave interface identifier.

In some implementations, such as when a virtual device configuration includes multiple VRF slave interfaces, controller 330 may obtain the VRF interface identifier from a header of the packet, and may use the VRF interface identifier to query a forwarding table to determine a VRF slave interface identifier. For example, controller 330 may compare the VRF interface identifier to one or more VRF slave interface identifiers, corresponding to one or more VRF slave interfaces, in a forwarding table. In this case, controller 330 may determine a VRF slave interface identifier of the one or more VRF slave interface identifiers based on comparing the VRF interface identifier to the one or more VRF slave interface identifiers in the forwarding table. By using a forwarding table to determine the VRF slave interface, controller 330 is able to support virtual device configurations that include one VRF interface and multiple VRF slave interfaces.

In some implementations, controller 330 may modify a value identifying an incoming interface via which the packet is received. For example, controller 330 may replace an internal interface identifier that identifies the incoming interface as the internal interface with the VRF slave interface identifier that identifies the incoming interface as the VRF slave interface. In this case, a value indicating an incoming interface may be included in the packet (e.g., in a socket buffer) and, after controller 330 receives the packet from the internal interface, the internal interface identifier may be stored in the socket buffer as the value identifying the incoming interface (and not a value associated with the virtual device, such as the VRF slave interface identifier). In this case, controller 330 may replace the internal interface identifier with the VRF slave interface identifier, thereby allowing an upper communication layer to treat the VRF slave interface as the incoming interface, as described further herein.

By modifying a value of the incoming interface to a value associated with a virtual device, controller 330 is able to receive traffic from multiple locations and/or send the traffic to multiple destinations using an internal interface that is associated with multiple external interfaces. This reduces the cost of network infrastructure relative to a network infrastructure that uses multiple internal interfaces to route the traffic.

As further shown in FIG. 4, process 400 may include providing the packet to an upper communication layer after modifying the value identifying the incoming interface from which the packet is received (block 430). For example, controller 330 may provide the packet to an upper communication layer (e.g., an upper TCP/IP layer) where a socket that is matched (e.g., bound) to the virtual device may be used to provide the packet to a particular destination. An upper communication layer, such as an upper TCP/IP layer, may include a network layer, a data-link layer, a physical layer, a layer that is different from a TCP/IP layer to which the packet presently resides (e.g., a higher layer), a layer not included in the TCP/IP layers, or the like. In some cases, the upper TCP/IP layer may treat the VRF slave interface as the incoming interface, which may allow a socket to provide the packet to a destination (e.g., an application) that is matched to the virtual device associated with the VRF slave interface.

In some implementations, controller 330 may receive a first packet and a second packet, may modify the first packet and the second packet, may provide the first packet to a particular destination, and may provide the second packet to a destination that is different than the particular destination associated with the first packet. For example, assume controller 330 receives, from a packet processing component 320 and through an internal interface, the first packet that includes a first VRF interface identifier associated with a first VRF interface of a first virtual device. Further assume that the internal interface may be associated with multiple external interfaces. Further assume that controller 330 modifies and provides the first packet in a manner described above.

Additionally, assume controller 330 receives the second packet that includes a second VRF interface identifier associated with a second VRF interface of a second virtual device. In this case, assume the second packet is initially received by the packet processing component 320 via the internal interface. The packet processing component 320 may initially receive the second packet via an external interface of the multiple external interfaces that is different than an external interface of the multiple external interfaces that the packet processing component 320 received the first packet. Additionally, assume the second external interface is associated with the second virtual device. Furthermore, assume controller 330 modifies a value indicating an incoming interface from which the second packet is received by replacing the internal interface identifier that identifies the incoming interface as the internal interface with the second VRF interface identifier that identifies the incoming interface as the second VRF interface. This may allow controller 330 to provide the second packet to the upper communication layer. In some cases the second packet may be provided to a destination that is a different than the destination associated with the first packet.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By using packet processing component 320 to add the VRF identifier to the packet, and providing the packet through an internal interface to controller 330, controller 330 is able to route packets associated with an ingress data flow to different locations without requiring one internal interface for every external interface. This reduces network infrastructure cost relative to a network infrastructure that uses one internal interface for every corresponding external interface.

Figure 5:
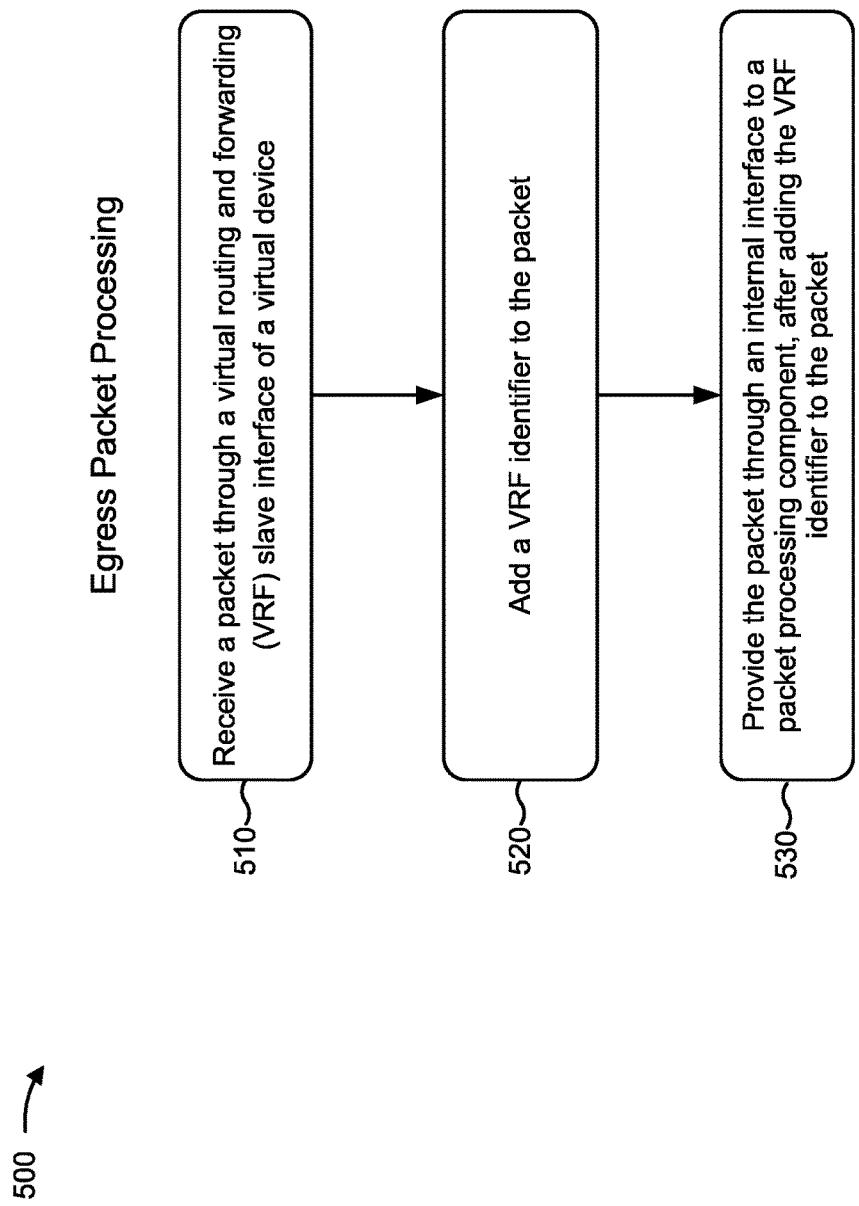
FIG. 5 is a flow chart of an example process for using VRF interfaces to transmit an egress packet using an internal interface.

FIG. 5 is a flow chart of an example process 500 for using VRF interfaces to transmit an egress packet using an internal interface. In some implementations, one or more process blocks of FIG. 5 may be performed by controller 330. In some implementations, one or more process blocks of FIG. 5 may be performed by another device or a group of devices separate from or including controller 330, such as switching fabric 310, packet processing component 320, and/or the like.

As shown in FIG. 5, process 500 may include receiving a packet through a virtual routing and forwarding (VRF) slave interface of a virtual device (block 510). For example, controller 330 (e.g., an encapsulation routine of controller 330) may receive a packet through a VRF slave interface of a virtual device. In some implementations, network device 220 may include multiple external interfaces that are associated with multiple packet processing components, and an internal interface via which all (or some) traffic flows. The packet may be received by controller 330 via an external interface that is one of the multiple external interfaces.

In some implementations, an application may use a socket to provide the packet to a VRF interface associated with a virtual device. For example, the application may execute a socket API call to match (e.g., bind) to the VRF interface of the virtual device. In this way, the VRF interface may serve as a binding interface that routes traffic associated with the application.

In some implementations, an application may use a socket to provide the packet to controller 330 through a VRF interface associated with a virtual device, and the virtual device may use a forwarding table (e.g., a FIB) to determine a VRF slave interface associated with the virtual device. For example, the virtual device may compare the VRF interface identifier associated with the VRF interface to one or more VRF slave interface identifiers associated with one or more corresponding VRF slave interfaces included in the forwarding table. In this case, the virtual device may select a VRF slave interface identifier of the one or more VRF slave interface identifiers, based on comparing the VRF interface identifier to the one or more VRF slave interface identifiers. Furthermore, the virtual device may provide the packet to an encapsulation routine of controller 330 through the VRF slave interface after selecting the VRF slave interface.

By receiving the packet through a VRF slave interface, controller 330 can add a VRF identifier to the packet.

As further shown in FIG. 5, process 500 may include adding a VRF interface identifier to the packet (block 520). For example, controller 330 (e.g., an encapsulation routine of controller 330) may use the VRF slave interface identifier to determine a VRF interface identifier, and may add the VRF interface identifier to a header of the packet (or may add a header to the packet that includes the VRF interface identifier). The VRF interface identifier may identify a VRF interface of the virtual device, and the VRF interface may be associated with an external interface. In some implementations, packet processing component 320 may use the VRF interface identifier to select an external interface to use as the outgoing interface.

In some implementations, controller 330 may determine the VRF interface identifier for the packet. For example, controller 330 may determine the VRF interface identifier by identifying a value included in the VRF slave interface identifier, and using at least a portion of the value to generate the VRF interface identifier. In some cases, controller 330 may generate the VRF interface identifier using at least a portion of the value included in the VRF slave interface identifier. By using at least a portion of a value included in the VRF slave interface identifier as the VRF interface identifier, controller 330 conserves processing resources relative to querying a forwarding table with the VRF slave interface identifier to determine the VRF interface identifier. In some implementations, controller 330 may determine the VRF interface identifier using a forwarding table, in the same manner described above.

In some implementations, controller 330 may add the VRF interface identifier to the packet, and may encapsulate the packet. For example, controller 330 may add the VRF interface identifier to a header, and may encapsulate the packet with the header (e.g., add the header to the packet).

By adding the VRF interface identifier to the packet, packet processing component 320 may read the VRF interface identifier included in the packet to determine an outgoing interface to select for subsequent transmission of the packet.

As further shown in FIG. 5, process 500 may include providing the packet through an internal interface to a packet processing component, after adding the VRF interface identifier to the packet (block 530). For example, controller 330 may provide the packet to packet processing component 320 through the internal interface. In this case, packet processing component 320 may transmit the packet to a destination outside of network device 220 using an external interface associated with the VRF interface.

In some implementations, controller 330 may provide the packet to packet processing component 320, and packet processing component 320 may determine an external interface to use as the outgoing interface for the packet. For example, packet processing component 320 may analyze the packet to obtain the VRF interface identifier, and may use the VRF interface identifier to determine the external interface. In this case, packet processing component 320 may be associated with one or more external interfaces, where each external interface of the one or more external interfaces is matched to a particular VRF interface. In this way, packet processing component 320 is able to use the VRF interface identifier to select an external interface as the outgoing interface for subsequent transmission of the packet.

In some implementations, controller 330 may receive a first packet and a second packet, may add a first VRF interface identifier to the first packet and may add a second VRF interface identifier to the second packet, may transmit the first packet to a first destination, and may transmit the second packet to a second destination. For example, assume controller 330 receives the first packet through a first VRF slave interface of a first virtual device. In this case, controller 330 may determine the first VRF identifier associated with the first virtual device, and may add the first VRF identifier to the first packet. Further assume that controller 330 provides the first packet, through an internal interface, to a first packet processing component 320, and that the first packet processing component 320 transmits the first packet through a first external interface and to the first destination.

Additionally, assume controller 330 receives the second packet through a second VRF slave interface of a second virtual device. In this case, assume controller 330 determines that the second VRF identifier is associated with the second virtual device, and adds the second VRF identifier to the second packet. Further assume controller 330 provides the second packet, via the internal interface, to a second packet processing component 320. This may cause the second packet processing component 320 to transmit the second packet to the second destination, via a second external interface associated with the second VRF interface identifier. In some implementations, controller 330 may provide the second packet to the first packet processing component 320, and the first packet processing component 320 may transmit the second packet to the second destination.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

By adding the VRF identifier to the packet, and providing the packet through an internal interface and to packet processing component 320, controller 330 is able to route packets associated with an egress data flow to different locations without requiring multiple internal interfaces, thereby reducing network infrastructure cost.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
a packet processing component; and
one or more processors to:
 receive, from the packet processing component and through an internal interface, a packet that includes a virtual routing and forwarding (VRF) interface identifier associated with a VRF interface of a virtual device,
 the internal interface being a single physical interface associated with multiple external interfaces;
 identify an internal interface identifier, identifying the internal interface, in the packet;
 generate a VRF slave interface identifier using at least a portion of a value in the VRF interface identifier;
 replace the internal interface identifier in the packet with the VRF slave interface identifier to allow an upper communication layer to determine that the packet is coming from a VRF slave interface identified by the VRF slave interface identifier; and
 provide, based on replacing the internal interface identifier in the packet with the VRF slave interface identifier, the packet to an application via the upper communication layer.

2. The network device of claim 1, where the one or more processors are one or more first processors; and where the packet processing component comprises:
one or more second processors to:
receive the packet;
determine the VRF interface identifier;
add the VRF interface identifier to the packet; and
provide the packet to the one or more processors after adding the VRF interface identifier to the packet.

3. The network device of claim 1,
where the upper communication layer to treat the VRF slave interface as an incoming interface allowing a socket to provide the packet to the application.

4. The network device of claim 1, where the packet is a first packet, the VRF interface identifier is a first VRF interface identifier, the VRF interface is a first VRF interface, the VRF slave interface identifier is a first VRF slave interface identifier, and the virtual device is a first virtual device; and
where the one or more processors are further to:
receive, from the packet processing component and through the internal interface, a second packet that includes a second VRF interface identifier associated with a second VRF interface of a second virtual device,
identify the internal interface identifier in the second packet,
compare the second VRF interface identifier to one or more VRF slave interface identifiers included in a forwarding table,
the one or more VRF slave interface identifiers to correspond to one or more VRF slave interfaces,
determine a second VRF slave interface identifier of the one or more VRF slave interface identifiers based on comparing the second VRF interface identifier to the one or more VRF slave interface identifiers, and
replace the internal interface identifier in the second packet with the second VRF slave interface identifier.

5. The network device of claim 1, where the packet is a first packet, the VRF interface identifier is a first VRF interface identifier, the VRF interface is a first VRF interface, and the virtual device is a first virtual device; and
where the one or more processors are further to:
receive, from the packet processing component and through the internal interface, a second packet that includes a second VRF interface identifier associated with a second VRF interface of a second virtual device,
the packet processing component to receive the second packet via an external interface of the multiple external interfaces that is different than an external interface of the multiple external interfaces via which the packet processing component received the first packet;
identify the internal interface identifier in the second packet;
replace the internal interface identifier in the second packet with the second VRF interface identifier; and
provide the second packet to a destination that is different than a destination associated with the first packet.

6. The network device of claim 1, where the one or more processors, when providing the packet to the upper communication layer, are to:
provide the packet to at least one of:
a network layer, or
a datalink layer.

7. The network device of claim 1, where the one or more processors are further to:
obtain the VRF interface identifier from a header of the packet.

8. A method, comprising:
receiving, by a network device and from an application, a packet through a virtual routing and forwarding (VRF) interface of a virtual device;
determining, by the network device, a VRF slave interface associated with the VRF interface;
identifying, by the network device, a value included in a VRF slave interface identifier of the VRF slave interface;
generating, by the network device, a VRF interface identifier for the VRF interface using at least a portion of the value included in the VRF slave interface identifier;
adding, by the network device, the VRF interface identifier to the packet;
providing, to a packet processing component of the network device, the packet after adding the VRF interface identifier to the packet,
the network device to provide the packet to the packet processing component through an internal interface, and
the internal interface being a single physical interface associated with multiple external interfaces;
analyzing, by the packet processing component of the network device, the packet to determine an external interface using the VRF interface identifier,
the external interface being one of the multiple external interfaces; and
transmitting, by the packet processing component of the network device, the packet, through the external interface, to a destination outside of the network device.

9. The method of claim 8, where the multiple external interfaces are associated with multiple packet processing components of the network device.

10. The method of claim 8, where receiving the packet through the VRF interface comprises:
receiving the packet through the VRF interface and via a socket that is matched to the VRF interface; and
where the method further comprises:
comparing the VRF interface identifier to one or more VRF slave interface identifiers associated with one or more corresponding VRF slave interfaces included in a forwarding table,
the one or more corresponding VRF slave interfaces to include the VRF slave interface;
selecting the VRF slave interface based on comparing the VRF interface identifier to the one or more VRF slave interface identifiers; and
providing the packet to an encapsulation routine of the network device through the VRF slave interface after selecting the VRF slave interface.

11. The method of claim 8, where adding the VRF interface identifier to the packet comprises:
adding the VRF interface identifier to a header, and
adding the header to the packet before providing the packet to the packet processing component.

12. The method of claim 8, where the network device comprises at least one of:
a router,
a gateway,
a switch,
a firewall,
a hub,
a bridge, or
a server.

13. The method of claim 8, where the internal interface is one of a group of internal interfaces, and
wherein each internal interface, of the group of internal interfaces, is associated with corresponding external interfaces.

14. A non-transitory computer-readable medium storing instructions, the instructions comprising:
one or more instructions that, when executed by one or more processors of a network device, cause the one or more processors to:
receive, from a switching fabric and through an internal interface, a packet that includes a virtual routing and forwarding (VRF) interface identifier associated with a VRF interface,
the internal interface being a single physical interface linking the switching fabric to a controller of the network device, and
the internal interface being associated with a plurality of external interfaces of the network device and/or a plurality of packet processing components of the network device;
identify an internal interface identifier, identifying the internal interface, in the packet;
generate a VRF slave interface identifier using at least a portion of a value in the VRF interface identifier;
replace the internal interface identifier in the packet with the VRF slave interface identifier to allow an upper communication layer to determine that the packet is coming from a VRF slave interface identified by the VRF slave interface identifier; and
provide, based on replacing the internal interface identifier in the packet with the VRF slave interface identifier, the packet to an application via the upper communication layer.

15. The non-transitory computer-readable medium of claim 14, where the internal interface is associated with the plurality of external interfaces and the plurality of packet processing components.

16. The non-transitory computer-readable medium of claim 14, where the one or more instructions, that cause the one or more processors to receive the packet that includes the VRF interface identifier, cause the one or more processors to:
receive the packet that includes the VRF interface identifier after a packet processing component, of the plurality of packet processing components, determines the VRF interface identifier and adds the VRF interface identifier to a header of the packet,
the packet processing component to determine the VRF interface identifier after the packet processing component receives the packet from an external interface, of the plurality of external interfaces,
the external interface being associated with the VRF interface identifier.

17. The non-transitory computer-readable medium of claim 14,
where the upper communication layer to treat the VRF slave interface as an incoming interface, allowing an application that is matched to the VRF interface associated with the VRF slave interface to receive the packet.

18. The non-transitory computer-readable medium of claim 14, where the packet is a first packet, the VRF interface identifier is a first VRF interface identifier, the VRF interface is a first VRF interface, and the VRF slave interface identifier is a first VRF slave interface identifier; and
where the one or more instructions, when executed by the one or more processors, further cause the one or more processors to:
receive, from the packet processing component and through the internal interface, a second packet that includes a second VRF interface identifier associated with a second VRF interface;
identify the internal interface identifier in the second packet;
compare the second VRF interface identifier to one or more VRF slave interface identifiers included in a forwarding table,
the one or more VRF slave interface identifiers to correspond to one or more VRF slave interfaces,
determine a second VRF slave interface identifier of the one or more VRF slave interface identifiers based on comparing the second VRF interface identifier to the one or more VRF slave interface identifiers included in the forwarding table,
the second VRF slave interface identifier being associated with a second VRF slave interface, and
replace the internal interface identifier in the second packet with the second VRF slave interface identifier.

19. The non-transitory computer-readable medium of claim 14, where a socket matched to a virtual device associated with the VRF interface is used to provide the packet to a particular destination.

20. The non-transitory computer-readable medium of claim 18, where the first packet is forwarded to a first destination and the second packet is forwarded to a second destination.

* * * * *